United States Patent
Jones

(10) Patent No.: US 7,169,371 B2
(45) Date of Patent: Jan. 30, 2007

(54) PROCESS FOR THE TREATMENT OF MOLYBDENUM CONCENTRATE

(75) Inventor: David L. Jones, Delta (CA)

(73) Assignee: Cominco Engineering Services Ltd., Vancouver (CA)

(*) Notice: Subject to any disclaimer, the term of this patent is extended or adjusted under 35 U.S.C. 154(b) by 647 days.

(21) Appl. No.: 10/307,412

(22) Filed: Dec. 2, 2002

(65) Prior Publication Data

US 2003/0124040 A1    Jul. 3, 2003

(30) Foreign Application Priority Data

Dec. 3, 2001    (CA) .................................. 2364213

(51) Int. Cl.
C22B 15/00    (2006.01)
C22B 3/00     (2006.01)
C22B 34/30    (2006.01)

(52) U.S. Cl. .............................. 423/24; 423/27; 423/55

(58) Field of Classification Search ................ 423/24, 423/27, 55
See application file for complete search history.

(56) References Cited

U.S. PATENT DOCUMENTS

| 3,674,424 A | 7/1972 | Ames et al. |
| 3,694,147 A | 9/1972 | Chen et al. |
| 3,714,325 A | 1/1973 | Bloom et al. |
| 4,046,852 A | 9/1977 | Vertes et al. |
| 4,083,921 A | 4/1978 | Wesely |
| 4,512,958 A | 4/1985 | Bauer et al. |
| 5,874,055 A | 2/1999 | Jones |
| 6,149,883 A * | 11/2000 | Ketcham et al. .............. 423/54 |

FOREIGN PATENT DOCUMENTS

WO    WO 96 12675    5/1996

OTHER PUBLICATIONS

Database WPI, Section Ch, Week 197830, Derwent Publications Ltd., London, GB; AN 1978-54789A, XP002243557, Anonymous: "Removal of copper from molybdenum oxide, e.g. calcined molybdenite-by chemical treatment, e. g. leaching with ferric chloride, or magnetic sepn." Abstract & Research Disclosure, vol. 171, No. 063, Jul. 10, 1978 Emsworth, GB.

* cited by examiner

*Primary Examiner*—Steven Bos
(74) *Attorney, Agent, or Firm*—Russell Reyneke Law Corp.; Elbie R. de Kock

(57)    ABSTRACT

A method of treatment or purification of a molybdenum concentrate also containing copper, comprises the step of subjecting the molybdenum concentrate to pressure oxidation in the presence of oxygen and a feed solution containing copper (e.g. $CuSO_4$) and halide (e.g. $CuCl_2$) to produce a pressure oxidation solution containing copper and a solid residue containing molybdenum. The pressure oxidation solution may be combined with feed solution to a second pressure oxidation in which a copper concentrate is treated for the recovery of copper therefrom.

31 Claims, 4 Drawing Sheets

PROCESS FOR THE TREATMENT OF MOLYBDENUM CONCENTRATE

FIELD OF THE INVENTION

This invention relates to the treatment of a molybdenum concentrate. It also relates to the treatment of a copper-molybdenum concentrate for the recovery of metal values therefrom.

BACKGROUND OF THE INVENTION

Molybdenum occurs chiefly as molybdenite ($MoS_2$) and is often present in small amounts in ores also containing copper.

Typically, such an ore contains about 0.5% to 1% Cu (as sulphide) and about 0.01 to 0.03% Mo, by weight, although these concentrations vary widely. The ore is usually treated in a concentrator to produce a bulk concentrate containing about 25%–40% Cu and about 0.3%–2% Mo. The bulk concentrate is then treated in a molybdenum separation plant to produce a Cu concentrate and a Mo concentrate containing about 50% Mo and about 0.1–10% Cu as copper sulphide. The % Cu in the Mo concentrate varies widely as the separation of Cu from Mo is sometimes difficult and expensive. If the % Cu in the Mo concentrate is above about 0.25% Cu, it may incur a penalty in the market, or be difficult to market at all when the market is over-supplied. Mo concentrates containing high Cu, above 0.75%, are sometimes referred to as dirty Mo concentrates.

The dirty Mo concentrate is sometimes subjected to a leach process with a concentrated or strong ferric chloride solution, typically about 50 to 100 g/L chloride to produce a solution containing Cu and a low copper Mo concentrate containing less than about 0.25% Cu, as required by the market, in order to avoid the payment of a penalty. The amount of the penalty increases as the amount of Cu in the Mo concentrate increases.

The ferric chloride leach, however, is a capital intensive process with high operating costs. Copper recovery from the leach solution is difficult because of the high chloride content so that the solution is often discarded or blended with a heap leaching operation, which however results in chloride contamination and reagent losses. As a result of the high cost, some mining operations do not use the leaching process. They simply endeavour to produce the best quality Mo concentrate possible under the circumstances, which concentrate is then marketed taking the penalty for having a Cu concentration which is above the required maximum value.

There is, however, a trade-off between the amount of Cu in the high copper Mo concentrate produced by the process and the amount of Mo recovery to the Mo concentrate. The smaller the amount of Cu present in the Mo concentrate, the poorer the Mo recovery from the concentrate. Thus, it is beneficial to have a copper presence in the high copper Mo concentrate but, as indicated above, the presence of copper is problematical when using conventional processes.

It is accordingly an object of the present invention to provide an alternative process for the recovery of Mo from the so-called dirty Mo concentrate referred to above.

It is also an object of the invention to remove impurities, such as Mo and As, from a copper containing solution during a copper recovery process.

SUMMARY OF THE INVENTION

According to the invention there is provided a method for the treatment of a molybdenum concentrate also containing copper and/or zinc comprising the step of subjecting the concentrate to a pressure oxidation process which leaches the copper and/or zinc into solution leaving the bulk of the molybdenum in the residue, which residue is substantially copper and/or zinc free.

According to a further aspect of the invention there is provided a method of purification of a molybdenum concentrate contaminated with copper and/or zinc, comprising the step of subjecting the molybdenum concentrate to pressure oxidation in the presence of oxygen and a feed solution containing halide to produce a pressure oxidation solution containing copper and/or zinc and a solid residue containing molybdenum.

According to another aspect of the invention, there is provided a process for the extraction of molybdenum and copper, comprising the steps of subjecting a molybdenum-copper concentrate to a first pressure oxidation in the presence of oxygen and a first feed solution containing halide and copper (e.g. $CuCl_2$ and $CuSO_4$) to produce a first copper containing solution and a solid residue containing molybdenum; subjecting a copper concentrate to a second pressure oxidation in the presence of oxygen and a second feed solution containing halide and copper (e.g. $CuCl_2$ and $CuSO_4$) to produce a second copper containing solution and a solid residue; subjecting the second copper containing solution to solvent extraction to produce a pregnant copper solution and a raffinate; recycling a first portion of said raffinate as said second feed solution to the second pressure oxidation along with said first copper containing solution; and recycling a second portion of said raffinate as said first feed solution to the first pressure oxidation.

For convenience, a concentrate containing more copper than molybdenum is referred to as a "copper-molybdenum concentrate" and a concentrate containing more molybdenum than copper is referred to as a "molybdenum-copper concentrate".

The pressure oxidations may be carried out at a temperature of from about 115° C. to about 175° C., preferably 130° C. to 155° C.

The halide may be chloride and the chloride in the first and second feed solutions may be maintained at a value of about 8 to 15 g/L, preferably 12 g/L.

The second feed solution may contain from 0 to 50 g/L free acid as $H_2SO_4$.

The second feed solution may contain about 10 to 20 g/L, preferably 15 g/L, copper.

Further objects and advantages of the invention will become apparent from the description of preferred embodiments of the invention below.

BRIEF DESCRIPTION OF THE DRAWINGS

The invention is now described, by way of examples, with reference to the accompanying drawings, in which.

DETAILED DESCRIPTION OF PREFERRED EMBODIMENTS

According to one aspect of the process, the dirty Mo concentrate referred to above, containing about 50% Mo and about 0.5–10% Cu as copper sulphide, is subjected to a pressure oxidation process which leaches the copper into solution leaving the molybdenum in the residue, which residue is substantially copper free.

Figure 1:
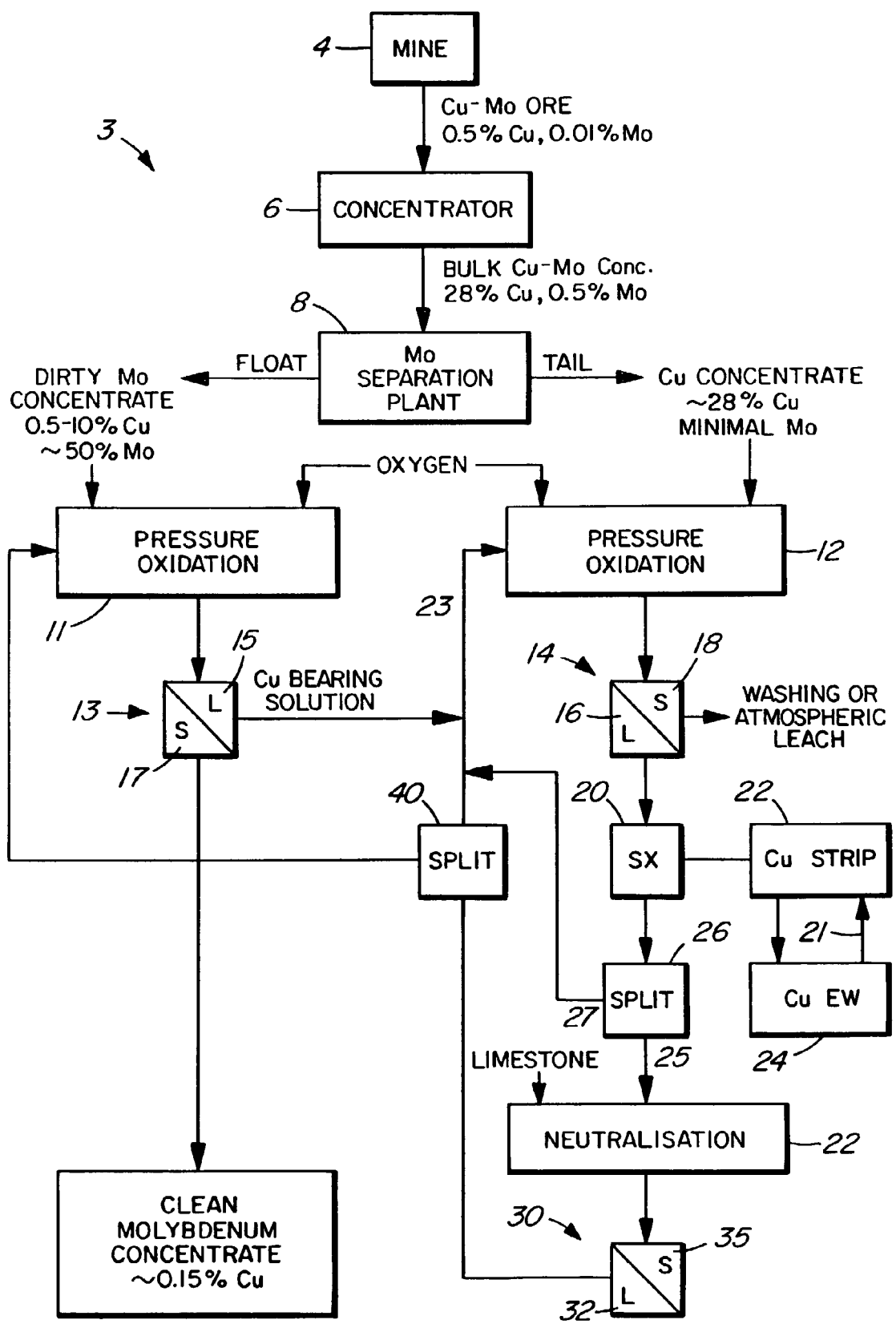
FIG. 1 is a flow diagram of a molybdenum and copper recovery process.

An integrated process 3 for the treatment of the high copper Mo concentrate (dirty concentrate) is shown in FIG. 1. FIG. 1 also shows how the high copper concentrate is obtained from a copper-molybdenum ore. The ore from mine 4 used in the present example contains about 0.5% Cu and about 0.01% Mo. The ore is processed in a concentrator 6, incorporating crushing, grinding and flotation, to produce a bulk concentrate containing about 28% Cu and 0.5% Mo. The ore is then subjected to a re-grind if necessary to reduce it to a particle size suitable to allow the next step (selective flotation) to proceed efficiently. The concentrate then proceeds to a Mo-separation plant 8. The plant 8 uses flotation under conditions specifically designed to suppress flotation of copper sulphide minerals while allowing $MoS_2$ to float. Special reagents (notably sodium sulphide or its derivatives) and specific conditions, such as high pH and low oxidative conditions, are necessary to achieve this separation.

The above Mo separation process is well-known and is therefore not described here in any further detail. As applied in practice, this process has its limitations, i.e. complete rejection of the copper minerals to the tailing (Cu concentrate) can only be achieved at the expense of some rejection of Mo minerals at the same time. Thus, the Cu concentrate contains significant amounts of Mo which represents a loss of Mo since the Mo in the Cu concentrate is not recoverable by normal accepted methods, e.g. smelting. This loss of Mo is minimized in the present process by allowing some copper minerals to float, thereby maximizing Mo recovery to the float concentrate. This results in the Mo concentrate having significant copper content. The Mo concentrate may also include zinc as an impurity along with the copper.

The float from the separation plant 8, therefore, comprises the high copper Mo concentrate containing about 45–50% Mo and 0.5–10% Cu. The tail from the separation plant comprises a copper concentrate containing about 28% Cu and a minimal amount of Mo.

The high copper Mo concentrate is subjected to pressure oxidation 11 in a stirred autoclave at a temperature of about 150° C. in the presence of oxygen and a feed solution containing copper (as $CuSO_4$) and chloride (as $CuCl_2$) for a retention time of about 1 hour. The copper content in the feed solution is maintained at about 15 g/L and the chloride content at about 12 g/L. The solids content in the pressure oxidation 11 is up to about 1000 g/L solids, but preferably about 500 g/L solids.

Figure 3:
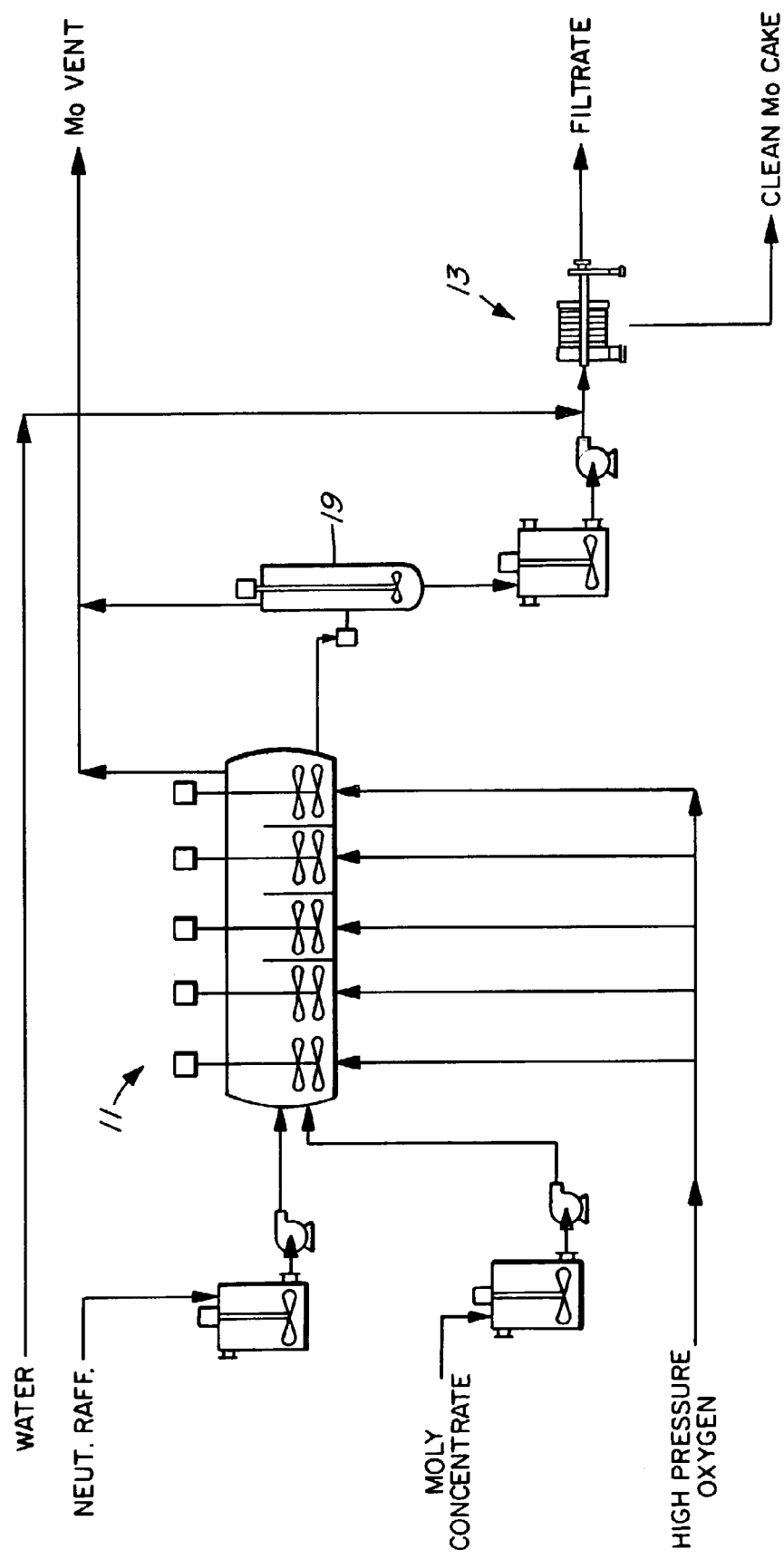
FIG. 3 is a flow diagram showing a first pressure oxidation stage of the processes of FIGS. 1 and 2 in greater detail.

The slurry from the pressure oxidation 11 is flashed down to atmospheric pressure in a flash tank 19 (FIG. 3) and cooled. It is then filtered, as shown at 13, to produce a liquid 15 and a solid 17.

In the pressure oxidation 11, about 95% of the copper in the Mo concentrate is leached into the solution 15, thus reducing the amount of copper in the Mo concentrate to about 0.15% Cu, while only about 1–2% of the molybdenum present in the concentrate is leached into the solution 15, thereby resulting in a significantly improved copper removal. The results of particular tests illustrating this are given in Examples 1 to 3 below. The liquid 15, in the present example, contains about 30 g/L Cu, 3–7 g/L Mo, 0–30 g/L free acid and some iron. The composition of the liquid will of course vary depending on the type of ore being treated.

If the Mo concentrate also contains zinc, the solution 15 will also contain zinc which can be removed by precipitation or a bleed circuit. If economical amounts of zinc are present then the zinc may be removed by solvent extraction and electrowinning.

The Cu concentrate from the tail of the separation plant 8 is also subjected to pressure oxidation 12 in an autoclave under the same conditions as the pressure oxidation 11, except that the solids content is lower, e.g. about 120–300 g/L solids.

Figure 4:
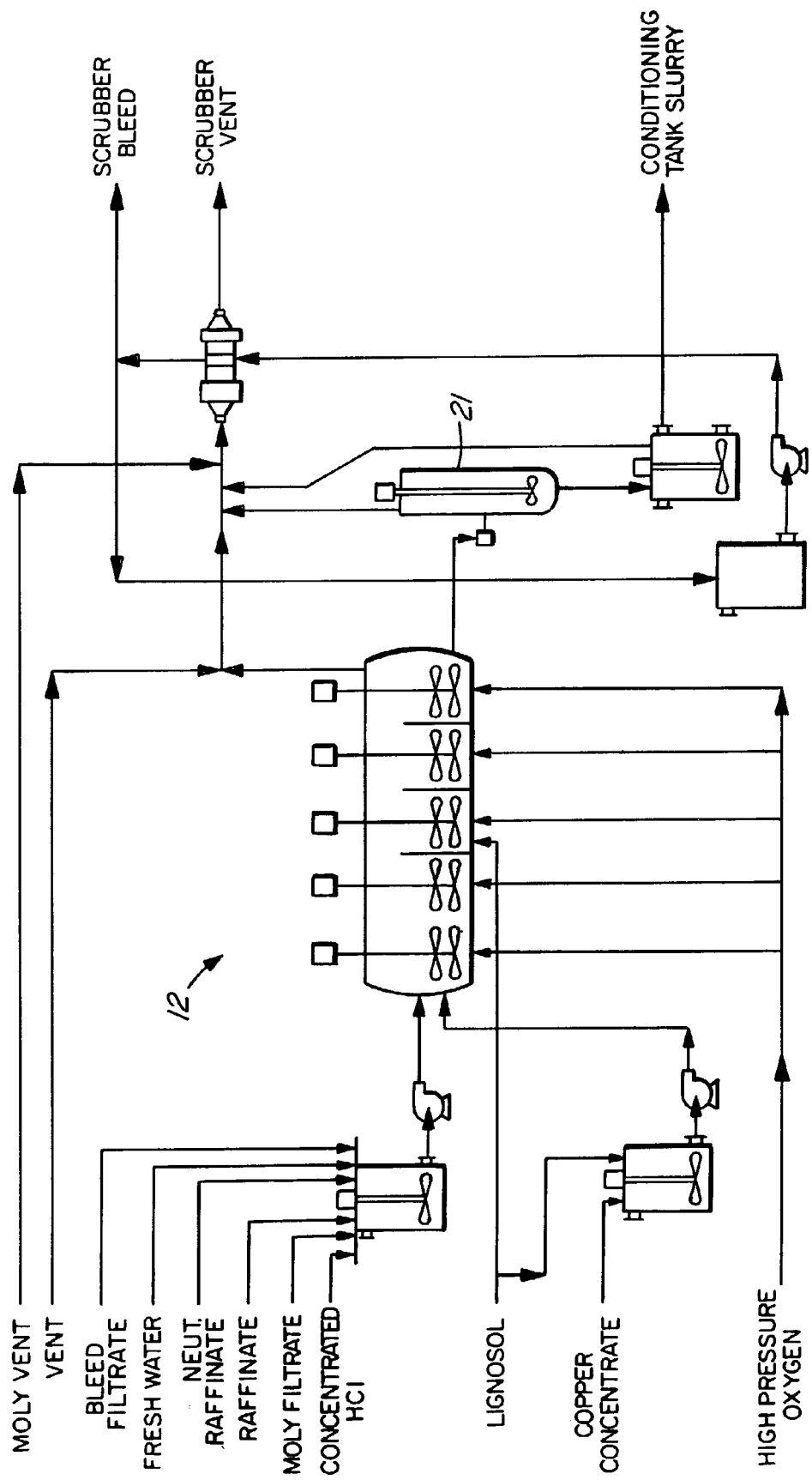
FIG. 4 is a flow diagram showing a second pressure oxidation stage of the processes of FIGS. 1 and 2 in greater detail.

After the pressure oxidation 12, the resulting pressure oxidation slurry is flashed down to atmospheric pressure in a flash tank 21 (FIG. 4) and cooled. It is then filtered as indicated at 14 (FIG. 1), to produce a liquid 16 and a solid residue 18.

Figure 2:
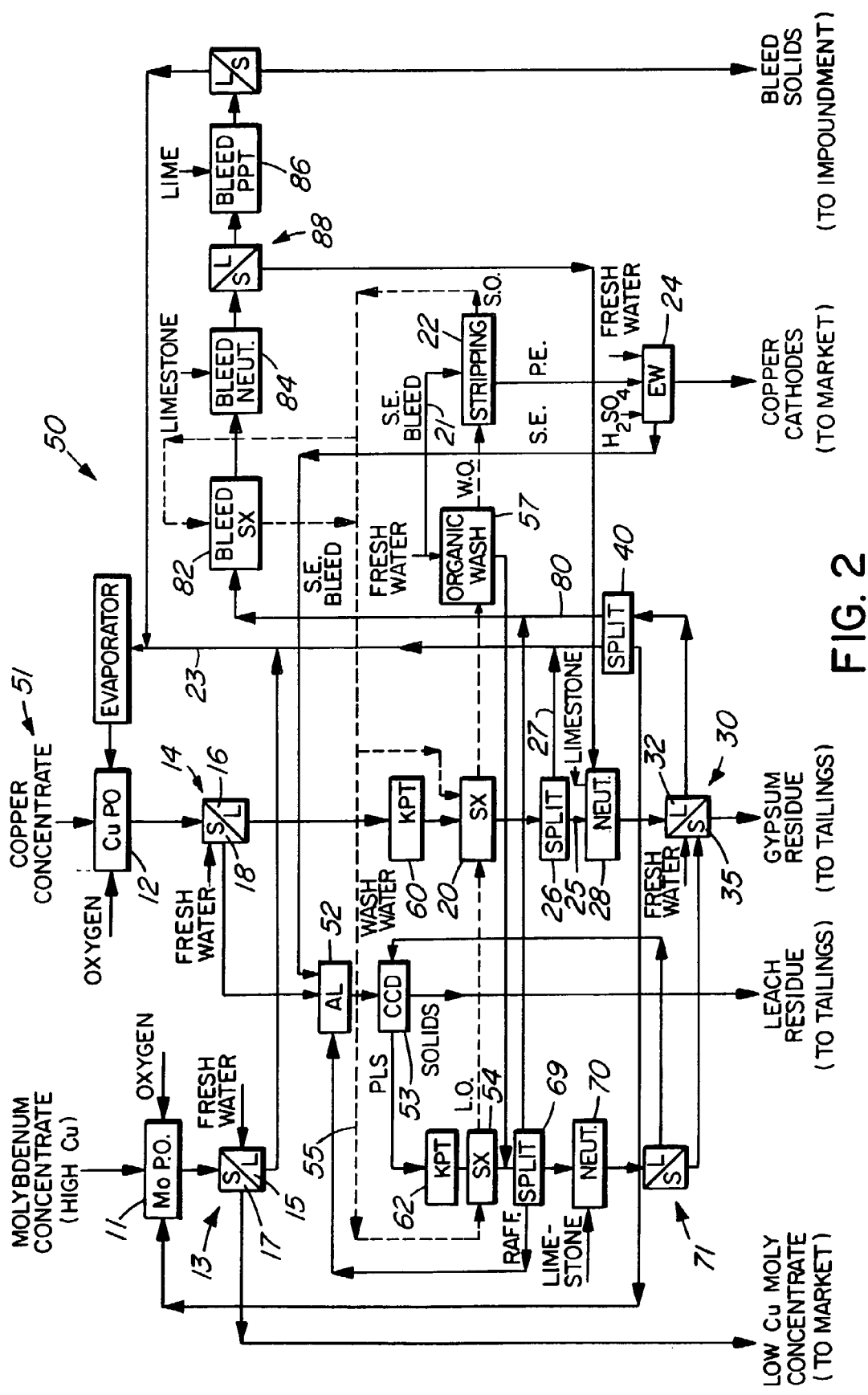
FIG. 2 is a flow diagram of another molybdenum and copper recovery process.

The solid residue 18 can be further treated for copper recovery by subjecting it to washing followed by leaching at atmosphere pressure with $H_2SO_4$, as shown in the process of FIG. 2, to be described below.

The pressure oxidations 11 and 12 can be carried out batchwise or in continuous fashion. The latter is to be preferred since the autoclave is continuously in use and no external heating is required to initiate the exothermic pressure oxidation reactions.

Both pressure oxidations 11 and 12 are carried out under an oxygen pressure of about 350 to 1800 kPa, preferably 1000 kPa. This is partial oxygen pressure over and above the steam pressure in the autoclave.

When the pressure oxidations 11, 12 are carried out in continuous fashion, oxygen, which is about 95% to 98% pure (the remainder being inert gases such as nitrogen and argon) is fed to the autoclave. As the oxygen reacts during pressure oxidation, the oxygen content vis à vis the inert components is reduced. A gas bleed is, therefore, taken from the autoclave in order to maintain a steady amount of about 80–85% oxygen content in the autoclave. A minimum oxygen content of at least about 60% in the autoclave is considered necessary for the pressure oxidation to proceed satisfactorily.

A surfactant, such as Lignosol™ may be added to the pressure oxidation 12 to counteract wetting of unreacted sulphides by liquid elemental sulphur inside the autoclave, which would otherwise prevent such sulphide particles from reacting completely. The surfactant has the effect of changing the physical properties of the liquid sulphur.

The pressure oxidation liquid or solution 16, which in the present example contains about 20 g/L free acid and about 40 g/L Cu and a negligible amount of Mo is subjected to Cu solvent extraction 20 with a suitable extractant (typically an organic) to produce a pregnant copper solution and a raffinate. The pregnant solution (loaded organic) is subjected to stripping, as shown at 22, and is then subjected to electrowinning 24 to recover copper. The copper stripping 22 is effected by means of spent electrolyte which is recycled from the electrowinning 24, as indicated by arrow 21.

The raffinate resulting from the solvent extraction 20, which now contains a reduced amount of copper (about 13 g/L) as well as chloride and about 60 g/L free acid, is split into two portions 25 and 27, as indicated at 26. The portion 27 is recycled to the pressure oxidation 12, as shown.

The portion 25 is subjected to neutralization 28 with limestone so that it contains essentially no free acid and is subjected to a liquid/solid separation 30 to produce a liquid 32 and a solid residue 35. The residue 35 is essentially gypsum and may be discarded after washing.

The liquid 32 is split, as indicated at 40, in a certain ratio. The ratio is determined by factors such as the relative amounts of Mo concentrate and Cu concentrate being treated in the pressure oxidations 11 and 12 (the Mo concentrate usually being a much smaller amount) and the relative solids densities at which the pressure oxidations 11, 12 are carried out, i.e. 500 and 140 g/L, respectively, in the present example. The split may vary from 5:1 to 500:1 to the pressure oxidation 12 and 11, respectively, for these reasons.

The pressure oxidation 11 is carried out at a relatively high solid density in order to maintain operating temperature. This is in view of the fact that it is the copper in the Mo concentrate which takes part in the exothermic reaction during pressure oxidation and the amount of copper in the concentrate is small.

In the pressure oxidation 12 on the other hand, the amount of copper in the ore is higher so that much more heat is generated by the exothermic reaction, so that the solids concentration must be lower for temperature control.

The smaller portion containing essentially no free acid is recycled to the pressure oxidation 11, to serve as the feed solution to the autoclave for the pressure oxidation 11. The major portion is combined with the copper bearing solution 15 from the pressure oxidation 11, as shown. The combined stream 23 which in the present example, contains about 10–50 g/L free acid ($H_2SO_4$), chloride (e.g. as $CuCl_2$) and copper (e.g. as $CuSO_4$) is recycled to serve as feed solution to the autoclave for the pressure oxidation 12. The chloride concentration in the feed solution is maintained at a value of about 12 g/L and the copper concentration at about 10–20 g/L, preferably 15 g/L. Although in the present example, the feed solution is shown as the recycled raffinate stream 23, it will be appreciated that the required amounts of acid, copper and chloride may be provided from any other suitable source, e.g. an external source.

It has been found that effectively all Mo in the solution 15 is precipitated in the pressure oxidation 12 and forms part of the solid residue 18. In this way Mo is removed from the copper bearing solution 15. If the solution 15 contains arsenic, this impurity is removed in a similar fashion. The results of particular tests illustrating this are given in Examples 4 an 5 below.

In the present example the split at 26 is about 50–50, i.e. about half of the raffinate recycled to the pressure oxidation 12 is neutralized. However, this ratio may vary depending on the amount of acid generated in the autoclave during the pressure oxidation 12. Thus the feed solution may contain up to 50 g/L free acid in cases where little acid is generated in the pressure oxidation 12 and down to essentially no free acid in cases where large amounts of acid are generated.

The solid residue 17 is a clean Mo concentrate, the copper content of which has been reduced to market acceptable values, e.g. <0.2% Cu. The concentrate 17 can be further treated for Mo recovery or, alternatively, the concentrate can be marketed.

FIG. 2 shows a process 50 in which treatment of the dirty Mo concentrate forms part of a larger copper recovery process. The copper recovery process, as well as the recovery of other metals present in the pressure oxidation solution 16 is more fully described in U.S. Pat. Nos. 5,645,708 and 5,874,055, as well as U.S. Pat. No. 5,855,858, the entire contents of which is incorporated herein by reference.

The process 50 is similar to the process 3, except that, in addition to copper recovery from the Cu concentrate tail of the Mo separation plant 8, copper from a separate Cu concentrate 51 is also extracted. Parts of the process 50 corresponding with the process 3 are indicated by the same reference numerals.

The process 50 is an expanded version of the process 3 in that copper recovery from the residue 18 is effected by subjecting the residue 18 to an atmospheric leach 52 an then to liquid/solid separation (counter current decantation 53) to produce a copper solution which is subjected to solvent extraction 54 to recover copper therefrom.

As shown, the solvent extractions 54 and 20 are effected with the same extractant (indicated by the stream 55) which is recycled after the stripping 22. As shown, the loaded extractant from the solvent extractions 54 and 20 is washed with water at 57 prior to the stripping 22.

As shown, each solvent extraction 20 and 54 is preceded by a kerosene pre-treatment step 60 and 62, respectively. In the solvent extractions 20 and 54, kerosene together with a suitable copper extractant, typically an hydroxy-oxime is used. In the pre-treatment steps 60, 62, kerosene only is used to mimic to some extent, or to anticipate the physical problems that may occur in the solvent extractions 20 and 54. These problems may be due to:

(a) suspended solids in the aqueous feed solution, which can result in "crud" in the solvent extraction circuit; or (b) surfactants in the aqueous feed solution, which can result in contamination of the solvent used in solvent extraction, such that the solvent is no longer as immiscible as before, resulting in turn in poor separation of aqueous and organic phases in the settlers after solvent extraction (often referred to as high aqueous entrainment in the organic phase, and/or high organic entrainment in the aqueous phase produced form the settlers).

It is to minimize the above problems that the pre-treatment steps 60, 62 are introduced. In this way the problems occur in the pre-treatment steps where the phenomenon can be managed economically, because of the absence of the extractant which is much more costly than the kerosene.

The raffinate from the solvent extraction 54 is combined with wash water from the organic wash 57 and is then a split as indicated at 69. The one portion of the split 69 recycled to the atmospheric leach 52 and the other portion is subjected to neutralization 70 and subsequent liquid/solid separation 71 to produce a liquid which is recycled as wash water to counter current decantation (CCD) 72 and a solid which is combined with the gypsum solid 35.

In the present example, the split 69 is about 50–50. However, this ratio may vary in the same way as with the split 26 described above.

The process 50 also provides for a bleed stream 80 to be taken at the split 40. The stream 80 is subjected to solvent extraction 82 for copper recovery and subjected to neutralization 84 to precipitate impurities such as Ni, Co and Zn, (if present), as shown at 86, after passing through a thickener 88. The solids separated in the thickener 88 are sent to the neutralization 28.

EXAMPLE 1

A molybdenite concentrate, containing 45.2% Mo, 3.6% Cu, 3.6% Fe and 34.2% total sulphur, was subjected to pressure oxidation at 500 g/L solids density, using a feed solution containing 15 g/L Cu, 12 g/L Cl and 20 g/L free acid. The pressure oxidation was carried out at 150° C. at 200 psig (1480 Kpa) total pressure for a retention time of one hour.

After the pressure oxidation, the product slurry was filtered and the residue was washed with water. The pH of the filtrate was 0.91. The filtrate contained 31.34 g/L Cu, 3.64 g/L Mo and 5.87 g/L iron. Copper and molybdenum extraction was 96.2% and 1.6%, respectively (The copper extraction is solid based; the molybdenum extraction is solution based).

EXAMPLE 2

In another test the same Mo concentrate was subjected to pressure oxidation under the same conditions as above, except that the feed solution contained no free acid. The pH of the filtrate from the pressure oxidation was 1.06. The filtrate contained 33.04 g/L Cu, 6.64 g/L Mo and 7.24 g/L iron. Copper and molybdenum extraction was 95.2% and 2.7%, respectively.

EXAMPLE 3

In another test the same Mo concentrate was subjected to pressure oxidation under the same conditions as above, except that the feed solution contained 30 g/L free acid. The pH of the filtrate from the pressure oxidation was 1.03. The filtrate contained 30.60 g/L Cu, 3.04 g/L Mo and 6.16 g/L iron. Copper and molybdenum extraction was 94.1% and 1.3%, respectively.

As can be seen from the above three examples, high copper extraction is obtained while molybdenum extraction (representing Mo loss from the concentrate) is low.

EXAMPLE 4

A high copper concentrate containing about 32% Cu and 23% Fe by weight was subjected to pressure oxidation at 240 g/L solids density, using a feed solution containing 15 g/L, Cu, 12 g/L Cl and 31 g/L free acid. The feed solution also contained 0.298 g/L Mo and 6.65 g/L As.

The pressure oxidation was carried out at 150° C. at 200 psig (1480 Kpa) total pressure for a retention time of one hour.

After the pressure oxidation, the product slurry was filtered and the residue washed with water. The pH of the filtrate was 2.14. The filtrate contained 54.72 g/L Cu, 0.151 g/L Fe, 0.002 g/L Mo and no detectable arsenic.

EXAMPLE 5

In another test a medium copper concentrate containing about 21.4% Cu and 25% iron by weight was subjected to pressure oxidation at 200 g/L solids density using a feed solution containing 15 g/L Cu, 12 g/L Cl and 13 g/L free acid. The feed solution also contained 0.201 g/L Mo and 5.75 g/L As.

The pressure oxidation was carried out at 150° C. at 200 psig (1480 Kpa) total pressure for a retention time of one hour.

After the pressure oxidation, the product slurry was filtered and the residue washed with water. The pH of the filtrate was 2.53. The filtrate contained 51 g/L Cu, 0.064 g/L Fe, 0.001 g/L Mo and no detectable arsenic.

As can be seen from the results of Examples 4 and 5 the molybdenum and arsenic contained in the feed solution are effectively precipitated during the pressure oxidation.

Although certain preferred embodiments of the present invention have been shown and described in detail, it should be understood that various changes and modifications may be made therein without departing from the scope of the appended claims.

The invention claimed is:

1. A process for the extraction of molybdenum and copper, comprising the steps of:
    subjecting a molybdenumcopper concentrate to a first pressure oxidation in the presence of oxygen and a first feed solution containing copper and halide to produce a first copper containing solution and a solid residue containing molybdenum;
    subjecting a copper concentrate to a second pressure oxidation in the presence of oxygen and a second feed solution containing copper and halide to produce a second copper containing solution and a solid residue;
    subjecting the second copper containing solution to solvent extraction to produce a pregnant copper solution and a raffinate;
    recycling a first portion of said raffinate as said second feed solution to the second pressure oxidation along with said first copper containing solution; and
    recycling a second portion of said raffinate as said first feed solution to the first pressure oxidation.

2. The process according to claim 1, further comprising the step of subjecting said second portion to neutralization prior to recycling the second portion to the first pressure oxidation.

3. The process according to claim 1, wherein said molybdenumcopper concentrate and said copper concentrate are obtained by subjecting a coppermolybdenum concentrate to a flotation process to produce a float comprising said molybdenum-copper concentrate and a tail comprising said copper concentrate.

4. The process according to claim 1, wherein the first and second pressure oxidations are carried out at a temperature of from about 115° C. to about 175° C.

5. The process according to claim 4, wherein the pressure oxidations are carried out at a temperature of about 150° C.

6. The process according to claim 1, wherein said second feed solution contains from about 0 g/L to about 50 g/L free acid.

7. The process according to claim 6, wherein the copper in the first and second feed solutions has a concentration of about 10 to 20 g/L.

8. The process according to claim 7, wherein the concentration of copper in the feed solutions is about 15 g/L.

9. The process according to claim 1, wherein the halide is chloride and the chloride in the first and second feed solutions is maintained at a value of about 8 to 15 g/L.

10. A process according to claim 9, wherein the chloride in the feed solutions is maintained at a value of about 12 g/L.

11. The process according to claim 1, wherein the first pressure oxidation is carried out with a solids density of up to about 1000 g/L.

12. The process according to claim 11, wherein the solids density is about 500 g/L.

13. The process according to claim 1, wherein the first pressure oxidation is carried out with a solids density of about 250 to 800 g/L.

14. The process according to claim 1, wherein the second pressure oxidation is carried out with a solids density of about 120–300 g/L.

15. The process according to claim 1, wherein the copper is present as copper sulphate in the first and second feed solutions.

16. The process according to claim 1, wherein the halide is present as copper chloride in the first and second feed solutions.

17. A method for purification of a molybdenum concentrate contaminated with copper, comprising the step of subjecting the molybdenum concentrate to pressure oxidation in the presence of oxygen and a feed solution containing copper and chloride to produce a pressure oxidation solution containing copper and a solid residue containing molybdenum, the amount of chloride in the feed solution being about 8 to 15 g/L.

18. The method according to claim 17, wherein the pressure oxidation is carried out at a temperature of from about 115° C. to about 175° C.

19. The method according to claim 18, wherein the pressure oxidation is carried out at a temperature of about 150° C.

20. The method according to claim 17, wherein the pressure oxidation is carried out under an oxygen pressure of about 350 to about 1800 kPa.

21. The method according to claim 17, wherein the copper in the feed solution has a concentration of about 10 to 20 g/L.

22. The method according to claim 21, wherein the concentration of copper in the feed solution is about 15 g/L.

23. The method according to claim 17, wherein the chloride in the feed solution is maintained at a value of about 10 to 15 g/L.

24. A method according to claim 23, wherein the chloride in the feed solution is maintained at a value of about 12 g/L.

25. The method according to claim 17, wherein the feed solution is provided by recycling at least part of the pressure oxidation solution to the pressure oxidation.

26. The method according to claim 25, wherein the pressure oxidation solution is subjected to copper solvent extraction to produce a pregnant copper solution and a raffinate and wherein at least part of the raffinate is recycled to the pressure oxidation.

27. The method according to claim 18, wherein the pressure oxidation is carried out with a solids density of about 1000 g/L.

28. The method according to claim 18, wherein the pressure oxidation is carried out with a solids density of about 500 g/L.

29. The method according to claim 17, wherein the copper is present as copper sulphate in the feed solution.

30. The method according to claim 17, wherein the chloride is present as copper chloride in the feed solution.

31. The method according to claim 17, wherein the pressure oxidation is carried out with a solids density of about 250 to 800 g/L.

* * * * *